US012786327B2

(12) United States Patent
Nishimura

(10) Patent No.: US 12,786,327 B2
(45) Date of Patent: Nov. 3, 2026

(54) IMAGE READING DEVICE

(71) Applicant: SEIKO EPSON CORPORATION, Tokyo (JP)

(72) Inventor: Yoichiro Nishimura, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 451 days.

(21) Appl. No.: 18/419,377

(22) Filed: Jan. 22, 2024

(65) Prior Publication Data

US 2024/0323287 A1 Sep. 26, 2024

(30) Foreign Application Priority Data

Jan. 23, 2023 (JP) ................................ 2023-007961

(51) Int. Cl.
*H04N 1/00* (2006.01)

(52) U.S. Cl.
CPC ..... *H04N 1/00535* (2013.01); *H04N 1/00602* (2013.01); *H04N 1/0079* (2013.01)

(58) Field of Classification Search
None
See application file for complete search history.

(56) References Cited

U.S. PATENT DOCUMENTS

| | | | | |
|---|---|---|---|---|
| 2021/0373466 A1* | 12/2021 | Yasumitsu | ......... | G03G 15/2021 |
| 2022/0131994 A1* | 4/2022 | Hozono | ............... | H04N 1/1061 |
| 2023/0089229 A1* | 3/2023 | Nagata | ............... | G03G 15/6573 358/296 |
| 2023/0102040 A1* | 3/2023 | Koyanagi | .......... | H04N 1/00562 358/474 |

FOREIGN PATENT DOCUMENTS

| | | |
|---|---|---|
| JP | 2863381 B2 * | 3/1999 |
| JP | 2018-019201 A | 2/2018 |

* cited by examiner

*Primary Examiner* — Gabriel I Garcia
(74) *Attorney, Agent, or Firm* — WORKMAN NYDEGGER

(57) ABSTRACT

An image reading device includes an opening/closing cover configured to open and close, a first roller that can convey a medium, a reading unit reads an image of the medium, and an elastic member that applies a force to the opening/closing cover in a direction of the closed state or the open state, where the opening/closing cover includes a guide portion that is longer than a length of the first roller in a width direction intersecting a conveying direction, in the closed state, the guide portion is displaceable to a first position of advancing to a conveyance path and a second position of retreating, and is applied with an elastic force so as to take the first position when the first medium is conveyed and take the second position when a second medium having higher rigidity than the first medium is conveyed.

19 Claims, 12 Drawing Sheets

IMAGE READING DEVICE

The present application is based on, and claims priority from JP Application Serial Number 2023-007961, filed Jan. 23, 2023, the disclosure of which is hereby incorporated by reference herein in its entirety.

BACKGROUND

1. Technical Field

The present disclosure relates to an image reading device.

2. Related Art

An example of this type of device is described in JP-A-2018-19201.

JP-A-2018-19201 discloses a configuration in which a support unit is moved from a medium supporting position to detach a feed roller.

The device described in JP-A-2018-19201 has room for improvement in conveying the medium so that the medium can be suitably read by a reading unit when conveying the medium.

SUMMARY

In order to solve the above problem, an image reading device according to the present disclosure includes an opening/closing cover configured to turn with a rotation shaft as a turning fulcrum and to be opened and closed between an open state and a closed state, a first roller that is replaceable when the opening/closing cover is opened, the first roller being provided in a conveyance path, and a reading unit that is provided downstream of the first roller in a conveying direction along the conveyance path and reads an image of a medium, where an elastic member configured to apply a force to the opening/closing cover in a direction from the closed state to the open state is provided, the opening/closing cover includes a guide portion that guides the medium, the guide portion being longer than a length of the first roller in a width direction intersecting a conveying direction of the medium, in the closed state, the guide portion is displaceable between a first position at which the guide portion advances to the conveyance path and a second position at which the guide portion retreats from the conveyance path, and the guide portion is applied with force by the elastic member so as to take the first position when a first medium is conveyed by the first roller, and take the second position when a second medium having higher rigidity than the first medium is conveyed.

DESCRIPTION OF EMBODIMENTS

Figure 1:
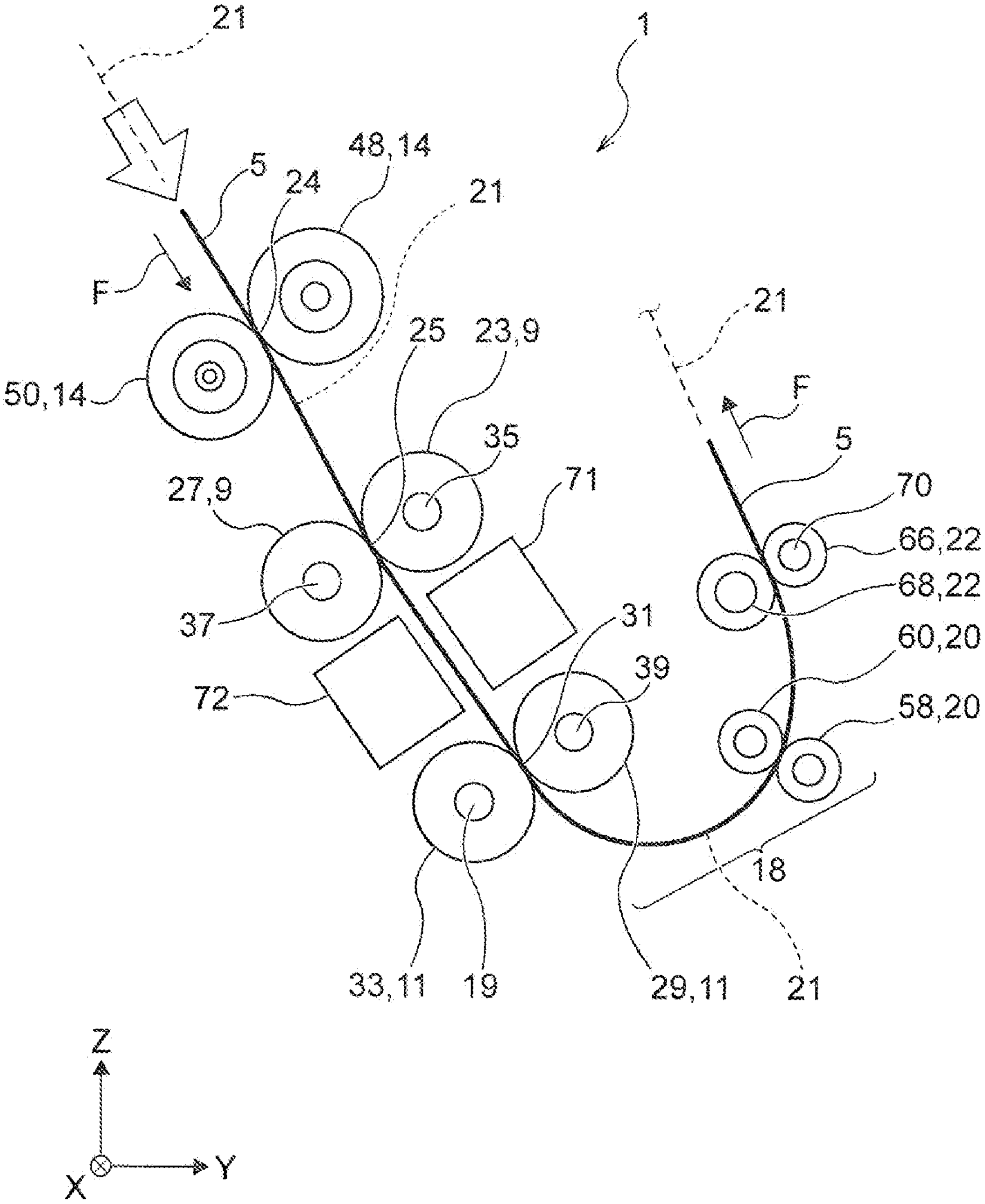
FIG. 1 is a schematic configuration diagram of a main part when an inside of an image reading device according to a first embodiment is viewed from a side.

Hereinafter, the present disclosure will be schematically described first.

In order to solve the above problem, an image reading device according to the present disclosure includes an opening/closing cover configured to turn with a rotation shaft as a turning fulcrum and to be opened and closed between an open state and a closed state, a first roller that is replaceable when the opening/closing cover is opened, the first roller being provided in a conveyance path, and a reading unit that is provided downstream of the first roller in a conveying direction along the conveyance path and reads an image of a medium, where an elastic member configured to apply a force to the opening/closing cover in a direction from the closed state to the open state is provided, the opening/closing cover includes a guide portion that guides the medium, the guide portion being longer than a length of the first roller in a width direction intersecting a conveying direction of the medium, in the closed state, the guide portion is displaceable between a first position at which the guide portion advances to the conveyance path and a second position at which the guide portion retreats from the conveyance path, and the guide portion is applied with force by the elastic member so as to take the first position when a first medium is conveyed by the first roller, and take the second position when a second medium having higher rigidity than the first medium is conveyed.

According to this aspect, the opening/closing cover includes the guide portion that guides the medium, the guide portion being longer than the length of the first roller in the width direction. Furthermore, in the closed state, the opening/closing cover is displaceable between a first position where the guide portion advances to the conveyance path and a second position where the guide portion retracts from the conveyance path. That is, since the opening/closing cover also serves as the guide portion, the guide portion can be provided without increasing the number of parts, and the conveyance accuracy of the medium can be improved. In addition, downsizing can be promoted.

Furthermore, the opening/closing cover is applied with a force by the elastic member so as to take the first position when a first medium is conveyed by the first roller and take the second position when a second medium having higher rigidity than the first medium is conveyed. As a result, displacement between the first position and the second position can be realized with a simple structure. In addition, an increase in back tension on the medium can be suppressed.

When the first medium is a medium having low rigidity such as thin paper, wrinkles such as wavy deformation are likely to generate in the medium due to contact with the first roller. However, in the present aspect, generation of wrinkles of the medium can be suppressed by displacing the guide portion having a length longer than the width of the first roller in the width direction to the first position where the guide portion advances to the conveyance path. On the other hand, when the second medium is the medium having high rigidity, the wrinkles are less likely to generate, but since the medium having high rigidity such as a booklet has a large thickness in most cases, the conveyance path becomes narrow in the thickness direction of the medium by the increased thickness, the conveying resistance is increased, and the medium is likely to be unstably conveyed. However, in the present aspect, the increase in the thickness can be canceled out by the guide portion being displaced to the second position where the guide portion retracts from the conveyance path. As a result, even if the second medium is a medium having high rigidity, an increase in conveying resistance can be suppressed, and stable conveyance can be realized.

A second aspect of the image reading device according to the present disclosure is an aspect dependent on the first aspect, in which the opening/closing cover includes: an abutment portion capable of abutting on the elastic member, and an engaging portion that is not engaged with an engaged portion in the closed state but engageable with the engaged portion in the open state.

According to the present aspect, since the opening/closing cover includes the abutment portion and the engaging portion, it can be stably displaced between the open state and the closed state by being turned with the rotation shaft as a turning fulcrum.

An image reading device according to a third aspect of the present disclosure is an aspect dependent on the first aspect and the second aspect, where the first position is a position at which the guide portion is most advanced with respect to the conveyance path, and the second position is a position at which the guide portion is least advanced with respect to the conveyance path.

According to this aspect, the first position is a position where the guide portion is most advanced with respect to the conveyance path, and the second position is a position where the guide portion is least advanced. Accordingly, in the case of the medium having the lowest rigidity, the medium can be conveyed in a state where the rigidity of the medium is increased by displacing the guide portion to the first position. On the other hand, in the case of a medium having high rigidity and the largest thickness, an increase in the conveying resistance of the medium can be suppressed by displacing the guide portion to the second position, and stable conveyance can be prevented from being inhibited.

An image reading device according to a fourth aspect of the present disclosure is an aspect dependent on any one of the first to third aspects, where when the guide is at the first position, a downstream end of the guide portion protrudes further than an upstream end of the guide portion.

According to the present aspect, when the guide portion is at the first position, a downstream end of the guide portion protrudes more than an upstream end of the guide portion. As a result, the downstream end of the guide portion comes into contact with the medium, so that the medium can be formed in a curved shape, and the rigidity of the medium can be easily increased.

An image reading device according to a fifth aspect of the present disclosure is an aspect dependent on any one of the first to fourth aspects, and includes a first conveyance roller that is provided between the first roller and the reading unit in the conveying direction and conveys the medium, in which the first roller is a roller pair including a separation roller capable of separating the medium, and the separation roller is disposed on an inner side of both ends of the first conveyance roller in the width direction.

According to the present aspect, a first conveyance roller that is provided between the first roller and the reading unit and conveys a medium is provided, and the first roller is a roller pair including a separation roller capable of separating the medium. Furthermore, the separation roller is disposed on the inner side of both ends of the first conveyance roller. As a result, the separation function of the separation roller can be effectively exhibited while increasing the space efficiency of the installation portion of the first conveyance roller and the separation roller. In addition, an increase in back tension on the medium can be suppressed.

An image reading device according to a sixth aspect of the present disclosure is an aspect dependent on the fifth aspect, where a center of a rotation shaft of the guide portion is located upstream of a nip position of the separation roller in the conveying direction, and a downstream end of the guide portion is located between the separation roller and the first conveyance roller in the conveying direction.

According to the present aspect, the center of the rotation shaft of the guide portion is located upstream of the nip position of the separation roller in the conveying direction. Furthermore, a downstream end of the guide portion is located between the separation roller and the conveyance roller in the conveying direction. As a result, the guide portion can be brought into stable contact with the medium conveyed downstream from the separation roller, and thus wrinkles of the medium generated by the separation roller can be stably corrected and planarized.

An image reading device according to a seventh aspect of the present disclosure is an aspect dependent on the fifth aspect, where the first conveyance roller includes two rollers arranged side by side in the width direction, and a length of the guide portion in the width direction is longer than a distance between the two rollers.

According to the present aspect, a length of the guide portion in the width direction is longer than a distance between the two rollers constituting the first conveyance roller. Thus, the wrinkles of the medium generated by the separation roller can be more reliably corrected and planarized.

The function of correcting the wrinkle can be further enhanced by making the length of the guide portion longer than the distance between both ends of the two rollers.

An image reading device according to an eighth aspect of the present disclosure is an aspect dependent on the second aspect, where the rotation shaft is located at an upstream end of the opening/closing cover, the engaging portion is located at a downstream end of the opening/closing cover, and the elastic member is located closer to the engaging portion than the rotation shaft in the conveying direction.

According to this aspect, the elastic member is located closer to the engaging portion than the rotation shaft in the conveying direction. Thus, the elastic force of the elastic member can be stably applied.

An image reading device according to a ninth aspect of the present disclosure is an aspect dependent on any one of the first to eighth aspects, where the elastic member includes a first elastic member and a second elastic member, and the separation roller is located between the first elastic member and the second elastic member in the width direction.

According to the present aspect, since the separation roller is located between the first elastic member and the second elastic member in the width direction, elastic force can be applied to the opening/closing cover at two points, whereby the opening/closing cover can be stably displaced.

An image reading device according to a tenth aspect of the present disclosure is an aspect dependent on any one of the first to ninth aspects, where when the opening/closing cover is located at the first position, an advancing position of the guide portion with respect to the conveyance path is located above a virtual straight line connecting a nip position of the first roller and a nip position of the first conveyance roller when viewed in the width direction.

According to this aspect, when the opening/closing cover is located at the first position, the advanced position of the guide portion is located above the virtual straight line connecting the nip position of the first roller and the nip position of the first conveyance roller when viewed in the width direction, that is, in the side view direction. Accordingly, the wrinkles of the medium generated by the first roller can be effectively corrected and planarized.

An image reading device according to an eleventh aspect of the present disclosure is an aspect dependent on any one of the first to tenth aspects, and includes a multi-feed detection unit capable of detecting multi-feeding of the medium, where the opening/closing cover is provided with a cutout part, and the multi-feed detection unit is exposed from the cutout part in the closed state.

According to the present aspect, the opening/closing cover is provided with a cutout part, and the multi-feed detection portion is exposed from the cutout part in the closed state. As a result, the multi-feed detection unit can be arranged in a space-saving manner.

An image reading device according to a twelfth aspect of the present disclosure is an aspect dependent on the fifth aspect, and further includes a second conveyance roller provided downstream of the first conveyance roller, and a curved inversion path that is provided downstream of the second conveyance roller and is curved and inverted, where the second conveyance roller includes two rollers arranged side by side in the width direction, and a length of the guide portion in the width direction is longer than a distance between the two rollers.

According to the present aspect, a length of the guide portion is longer than a distance between the two rollers constituting the second conveyance roller. In this respect, the wrinkles of the medium generated by the first roller can be effectively planarized.

When the medium passes through the curved inversion path, if wrinkles such as wavy deformation are generated, the wrinkles are crushed and traces remain. However, in the present aspect, the medium is sent to the curved inversion path in a state where the wrinkles are corrected and planarized by the guide portion. As a result, it is possible to reduce the possibility of the wrinkle being crushed and the traces remaining at the curved inversion path. In the structure in which the plurality of ribs are arranged in the width direction in the curved inversion path, the problem of "crushing and traces remaining" is likely to occur, but in the present aspect, the occurrence of such a problem can be reduced.

An image reading device according to a thirteenth aspect of the present disclosure is an aspect dependent on an any one of the first to twelfth aspects, where the elastic member is integrally formed with the opening/closing cover. The "integral configuration" can be realized, for example, by integrally molding or the like using a plastic material and making a portion corresponding to the elastic member elastically deformable.

According to the present aspect, since the elastic member is integrally formed with the opening/closing cover, the number of parts can be reduced.

An image reading device according to a fourteenth aspect of the present disclosure is an aspect dependent on any one of the first to thirteenth aspects, and further includes a first conveyance roller that is provided between the first roller and the reading unit in the conveying direction and conveys a medium, and an upper guide that forms a part of the conveyance path, where the medium guided by the guide portion comes into contact with a guiding surface of the upper guide and is guided toward the first conveyance roller.

According to this aspect, the medium guided by the guide portion comes into contact with the guiding surface of the upper guide and is guided toward the first conveyance roller. Thus, the medium can be stably guided to the first conveyance roller.

An image reading device according to a fifteenth aspect of the present disclosure is an aspect dependent on the fourteenth aspect, where the upper guide is displaceable in a direction intersecting the conveying direction and is located at a position not overlapping the guide portion in the conveying direction.

According to the present aspect, the upper guide is displaceable and is located at a position not overlapping the movable portion in the conveying direction. As a result, the distance between the movable portion and the upper guide can be increased, and the possibility of interference between the movable portion and the upper guide can be reduced even if the advancing amount of the movable portion with respect to the conveyance path and the amount of displacement of the upper guide are increased. Thus, the medium can be effectively planarized and conveyed.

An image reading device according to a sixteenth aspect of the present disclosure is an aspect dependent on the fourteenth aspect, where the upper guide is displaceable in a direction intersecting the conveying direction and is located at a position overlapping the guide portion in the conveying direction.

According to the present aspect, the upper guide is displaceable and is located at a position overlapping the guide portion in the conveying direction. Accordingly, downsizing in the conveying direction can be realized.

An image reading device according to a seventeenth aspect of the present disclosure is an aspect dependent on the tenth aspect, and includes an upper guide that is located on the upper side of the conveyance path and forms a part of the conveyance path, where the medium guided by the guide portion comes into contact with a guiding surface of the upper guide to be guided toward the first conveyance roller, and a most advanced position of the guide portion with respect to the conveyance path is located between an upstream end of the upper guide and a downstream end of the upper guide in a direction orthogonal to the virtual straight line.

According to the present aspect, the most advanced position of the guide portion with respect to the conveyance path is located between the upstream end of the upper guide and the downstream end of the upper guide in the direction orthogonal to the virtual straight line. Accordingly, the rigidity of the medium can be effectively enhanced.

An image reading device according to an eighteenth aspect of the present disclosure is an aspect dependent on the fifth or fourteenth aspect, and further includes a second conveyance roller located downstream of the first conveyance roller, where a protruding amount of the first conveyance roller with respect to the conveyance path is the same as a protruding amount of the second conveyance roller with respect to the conveyance path.

Here, the "protruding amount of the first conveyance roller with respect to the conveyance path" means a distance protruding upward with respect to the upper surface of the path constituting member in which the nip position guides the lower surface of the medium to be conveyed, at the position of the first conveyance roller in the conveying direction. Here, the "protruding amount of the second conveyance roller with respect to the conveyance path" means a distance protruding upward with respect to the upper surface of the path constituting member in which the nip position guides the lower surface of the medium to be conveyed, at the position of the second conveyance roller in the conveying direction.

According to the present aspect, a protruding amount of the first conveyance roller with respect to the conveyance path and a protruding amount of the second conveyance roller with respect to the conveyance path are the same. In this manner, since the protruding amounts of the first conveyance roller and the second conveyance roller are the same, the conveying ability of the medium is stabilized.

An image reading device according to a nineteenth aspect of the present disclosure is an aspect dependent on the fifth aspect, where the reading unit is provided to be movable in an intersecting direction intersecting the conveying direction, the first conveyance roller is configured by a pair of an upper conveyance roller located on an upper side of the medium and a lower conveyance roller located on a lower side of the medium, the upper conveyance roller is provided to be movable in an intersecting direction intersecting the conveying direction, an interlocking portion that moves the reading unit in the intersecting direction in conjunction with the movement in the intersecting direction of the upper conveyance roller is provided, and when the medium is conveyed in a state the guide portion is located at the second position, the upper conveyance roller moves in a direction away from the lower conveyance roller by the medium and the reading unit also moves in the same direction.

According to the present aspect, when the medium is conveyed in a state the guide portion is located at the second position, the upper conveyance roller moves in a direction away from the lower conveyance roller by the medium, so that the reading unit also moves in the same direction. As a result, when a thick medium such as a booklet is conveyed and read by the reading unit, the position of the reading unit is automatically lifted in the separating direction by the thick medium, so that reading by the reading unit can be performed at an appropriate reading distance, and reading is stabilized.

First Embodiment

Hereinafter, an image reading device according to a first embodiment of the present disclosure will be specifically described with reference to FIGS. 1 to 10.

In the following description, three axes orthogonal to each other are defined as an X-axis, a Y-axis, and a Z-axis, respectively, as illustrated in the respective drawings. Directions indicated by arrows of the three axes (X, Y, and Z) are + directions of the respective directions, and opposite directions are − directions. The Z-axis direction corresponds to a vertical direction, that is, a direction in which gravity acts, the +Z direction indicates a vertical upward direction, and the −Z direction indicates a vertical downward direction. The X-axis direction and the Y-axis direction correspond to horizontal directions. The +Y direction indicates a front direction of the device, and the −Y direction indicates a back direction of the device. The +X direction indicates a right direction of the device, and the −X direction indicates a left direction of the device.

Overall Configuration of Image Reading Device

An image reading device 1 according to the present embodiment is a scanner capable of reading an image on a medium 5. Here, the image means what is visually recorded on the medium, and is, for example, a character, a figure, a table, a picture, a photograph, or the like. In addition, the medium is not limited to a sheet, and also includes a card, a booklet, and the like. As illustrated in FIG. 1, the image reading device 1 includes reading units 71 and 72 that read an image of a medium 5, a first conveyance roller 9 that conveys the medium 5 in a conveying direction F along a conveyance path 21 and is provided upstream of the reading units 71 and 72 in the conveying direction F, and a second conveyance roller 11 provided downstream of the reading units 71 and 72. A first roller 14 that feeds the medium 5 set in a medium supporting unit (not illustrated) toward the first conveyance roller 9 in the conveying direction F is disposed upstream of the first conveyance roller 9 in the conveying direction F.

In the present embodiment, both the first conveyance roller 9 and the second conveyance roller 11 are configured by nip rollers that nip and convey the medium 5.

Specifically, the first conveyance roller 9 is configured by a pair of an upper conveyance roller 23, and a lower conveyance roller 27 that sandwiches the medium 5 with the upper conveyance roller 23 at a first nip position 25 and conveys the medium. The second conveyance roller 11 is configured by a pair of an upper second conveyance roller 29, and a lower second conveyance roller 33 that sandwiches the medium 5 with the upper second conveyance roller 29 at a second nip position 31 and conveys the medium.

Figure 2:
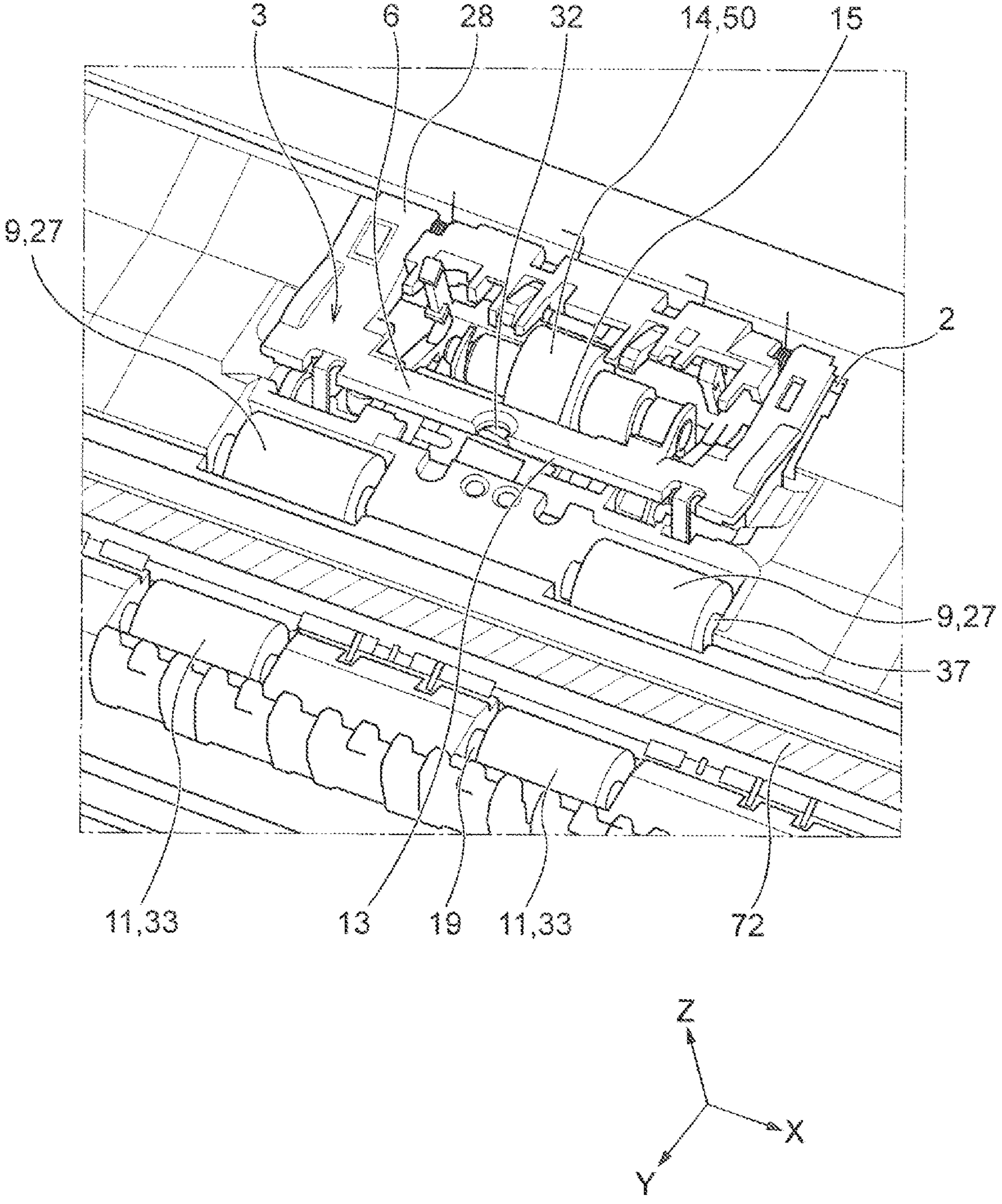
FIG. 2 is a perspective view of a main part of the first embodiment.
Figure 3:
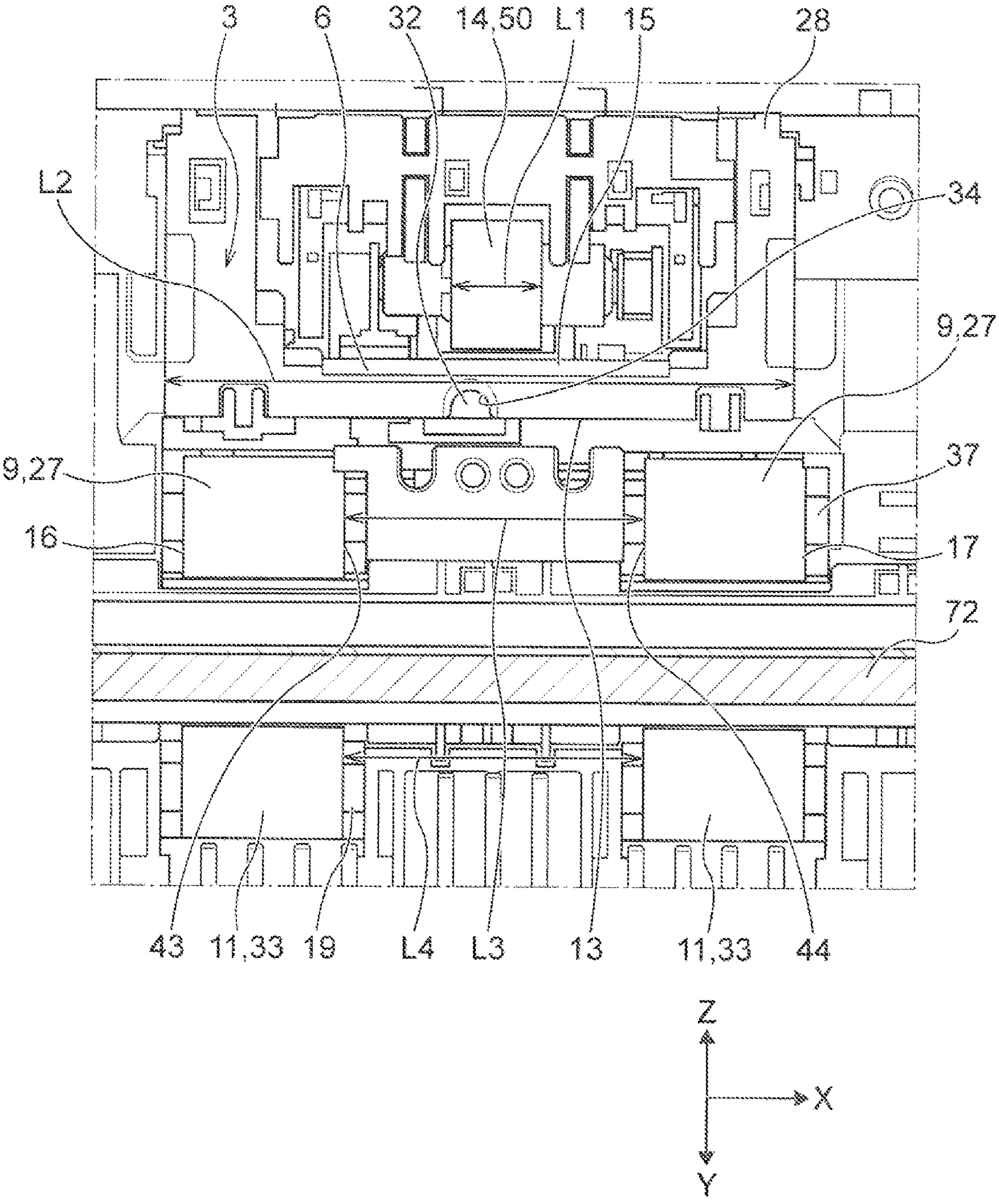
FIG. 3 is a plan view of a main part of the first embodiment.

As illustrated in FIGS. 2 and 3, each of the upper conveyance roller 23, the lower conveyance roller 27, the upper second conveyance roller 29, and the lower second conveyance roller 33 includes two rollers located at two positions spaced apart from each other in the axial direction of the rotation shafts 35, 37, 39, and 19. Note that in FIGS. 2 and 3, the upper conveyance roller 23 and the upper second conveyance roller 29 are not illustrated.

The first roller 14 is configured by a pair of nip rollers including a feed roller 48 and a separation roller 50. The feed roller 48 is a driving roller that feeds the medium 5 placed on a placement table (not illustrated). The separation roller 50 is a roller that separates one medium from the medium bundle. The separation roller 50 includes a torque limiter on a rotation shaft, and when feeding only one sheet of document, a torque exceeding a set value is applied to the torque limiter, and the separation roller 50 rotates in the feeding direction together with the feed roller 48. The separation roller 50 may be a roller to which no driving force is transmitted. The separation roller 50 may be a driving roller that rotates in a direction opposite to the feeding direction in which the medium is fed.

Figure 8:
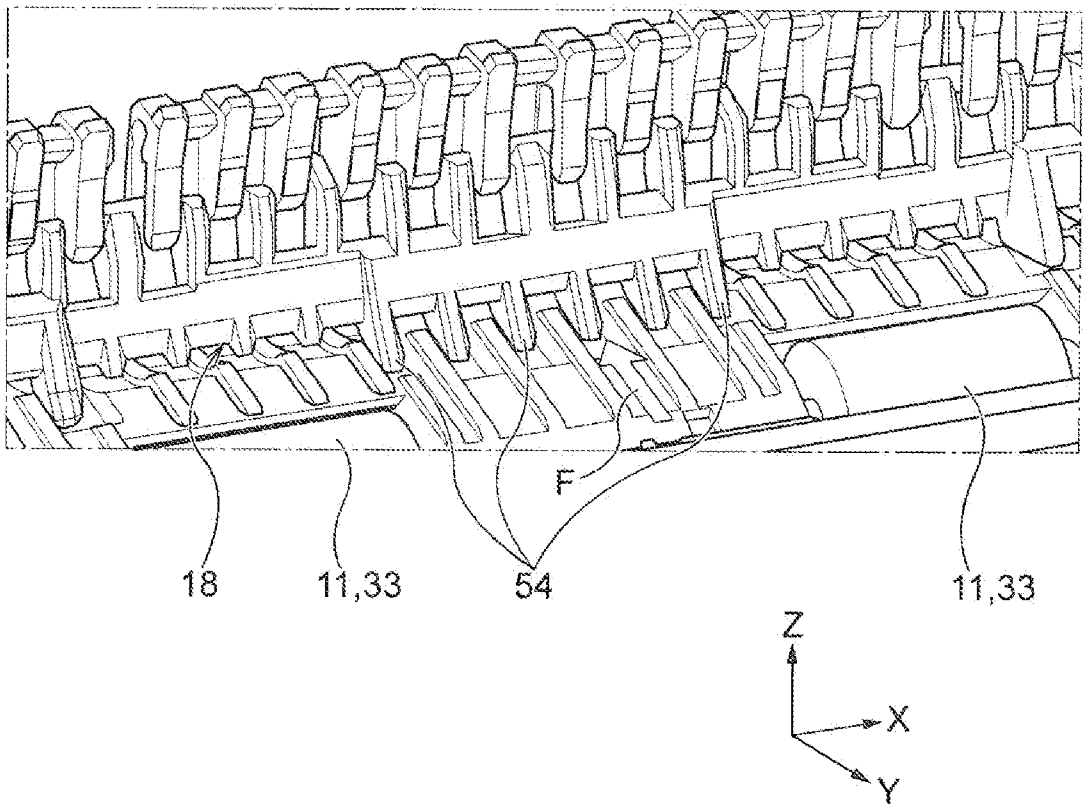
FIG. 8 is a perspective view of a main part of a portion of the curved inversion path of the first embodiment.

As illustrated in FIG. 1, in the present embodiment, a curved inversion path 18 forming a part of the conveyance path 21 is provided downstream of the second conveyance roller 11 in the conveying direction F. As shown in FIG. 8, a plurality of ribs 54 are provided in a protruding manner on the curved inversion path 18 at intervals in the width direction (X-axis direction). The rib 54 is provided to reduce the conveying resistance of the medium 5 in the curved inversion path 18.

An intermediate roller 20 is disposed at a downstream end portion of the curved inversion path 18, and a discharge roller 22 is disposed further downstream of the intermediate roller. The medium 5 discharged through the discharge roller 22 is supported and held by a receiving surface of a discharge receiving unit (not illustrated).

Furthermore, the intermediate roller 20 is configured by a pair of a driving roller 58 and a driven roller 60. The discharge roller 22 is configured by a pair of driving roller 66 and a driven roller 68.

Each operation of the first roller 14, the first conveyance roller 9, the second conveyance roller 11, the intermediate roller 20, the discharge roller 22, and the reading units 71, 72 is performed by a control unit (not illustrated). The control unit includes a CPU, a flash ROM, and a RAM. The CPU performs various arithmetic processing according to a program stored in the flash ROM, and controls the operation of the entire image reading device 1. A flash ROM, which is an example of a storage unit, is a readable and writable nonvolatile memory. Various types of information are temporarily stored in the RAM, which is an example of a storage unit.

Opening/Closing Cover

In the present embodiment, as illustrated in FIGS. 2 and 3, the opening/closing cover 3 is provided so as to surround the first roller 14. The opening/closing cover 3 can be opened and closed between an open state and a closed state when a free end located on the downstream side in the conveying direction F turned with the rotation shaft 2 (FIGS. 4 and 6) as a turning fulcrum. In the open state in which the opening/closing cover 3 is opened, the first roller 14 can be replaced. In the closed state of the opening/closing cover 3 (FIGS. 2 and 3), the first roller 14 is held at that position by the opening/closing cover 3.

Here, the separation roller 50 of the first roller 14 is replaceably held by the opening/closing cover 3. A structure in which the feed roller 48 of the first roller 14 is replaceably held by the opening/closing cover 3 may be adopted.

Figure 5:
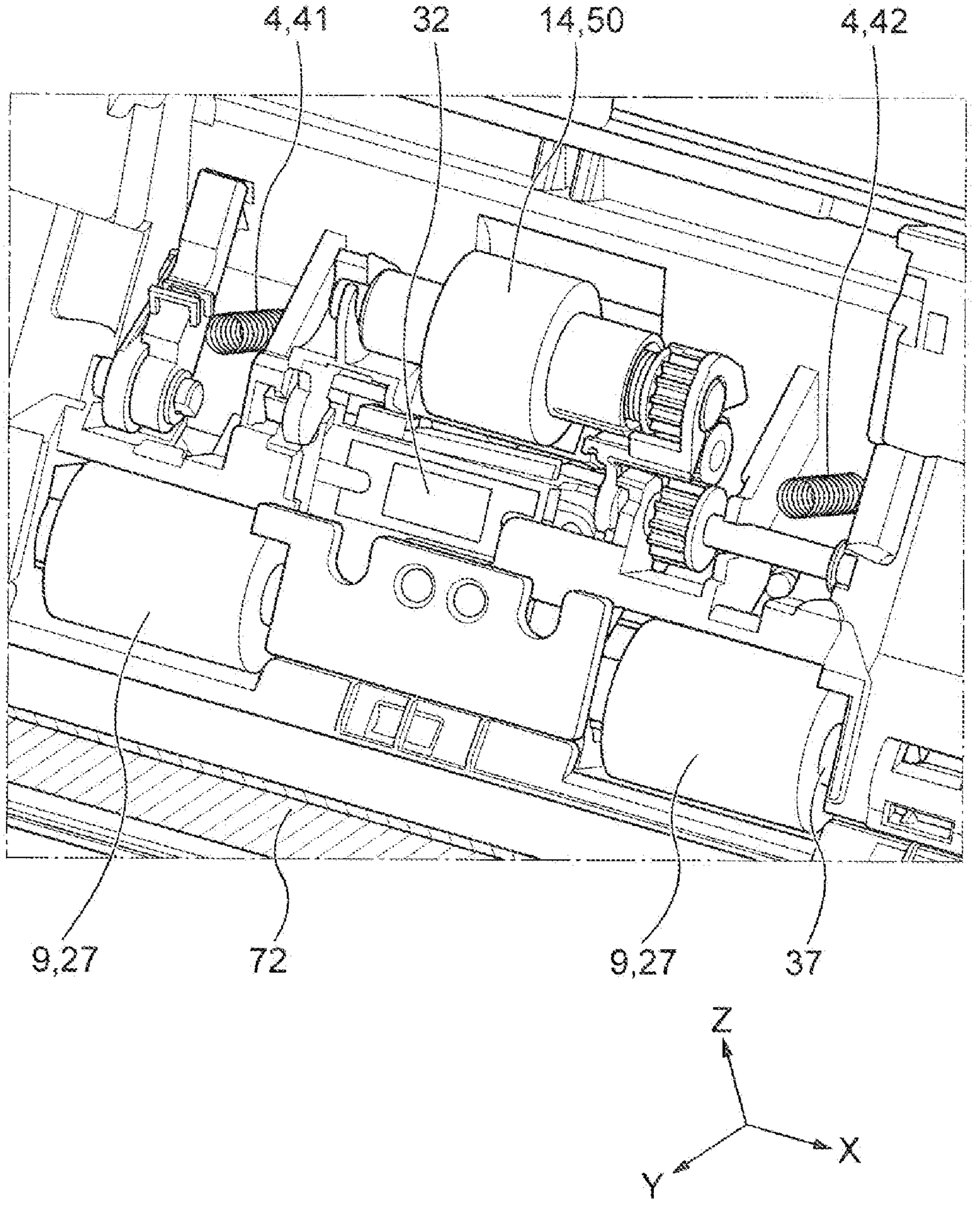
FIG. 5 is a perspective view of a main part of the first embodiment.

Although FIG. 5 illustrates a state in which the entire opening/closing cover 3 is removed, the first roller 14 can be replaced as described above without removing the opening/closing cover 3 as illustrated in FIG. 5.

Elastic Member

Figure 4:
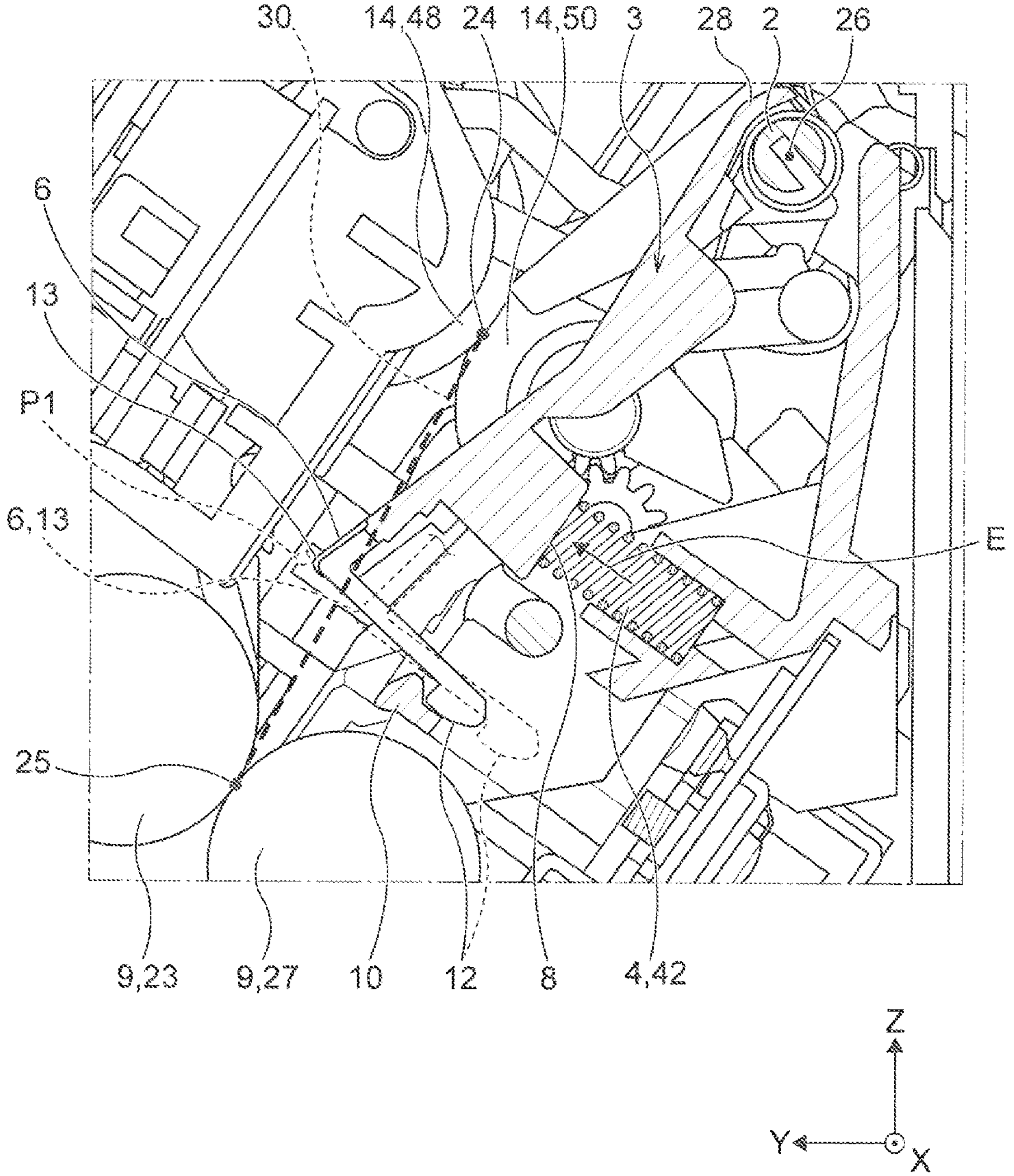
FIG. 4 is a configuration diagram of a main part of the first embodiment as viewed from the side.

In the present embodiment, as illustrated in FIG. 4, an elastic member 4 that applies elastic force to the opening/closing cover 3 is provided. The elastic member 4 is provided so as to apply an elastic force E to the opening/closing cover 3 in a direction from the closed state to the open state. Here, as illustrated in FIG. 5, a coil spring is used for the elastic member 4, and the elastic member 4 includes two members, a first elastic member 41 and a second elastic member 42. The separation roller 50 is located between first elastic member 41 and second elastic member 42 in the width direction (X-axis direction).

In the present embodiment, the opening/closing cover 3 includes an abutment portion 8 capable of abutting on the elastic member 4, and an engaging portion 12 that does not engage with the engaged portion 10 in the closed state and can engage with the engaged portion 10 in the open state. The engaged portion 10 is fixed to the device main body side.

Figure 6:
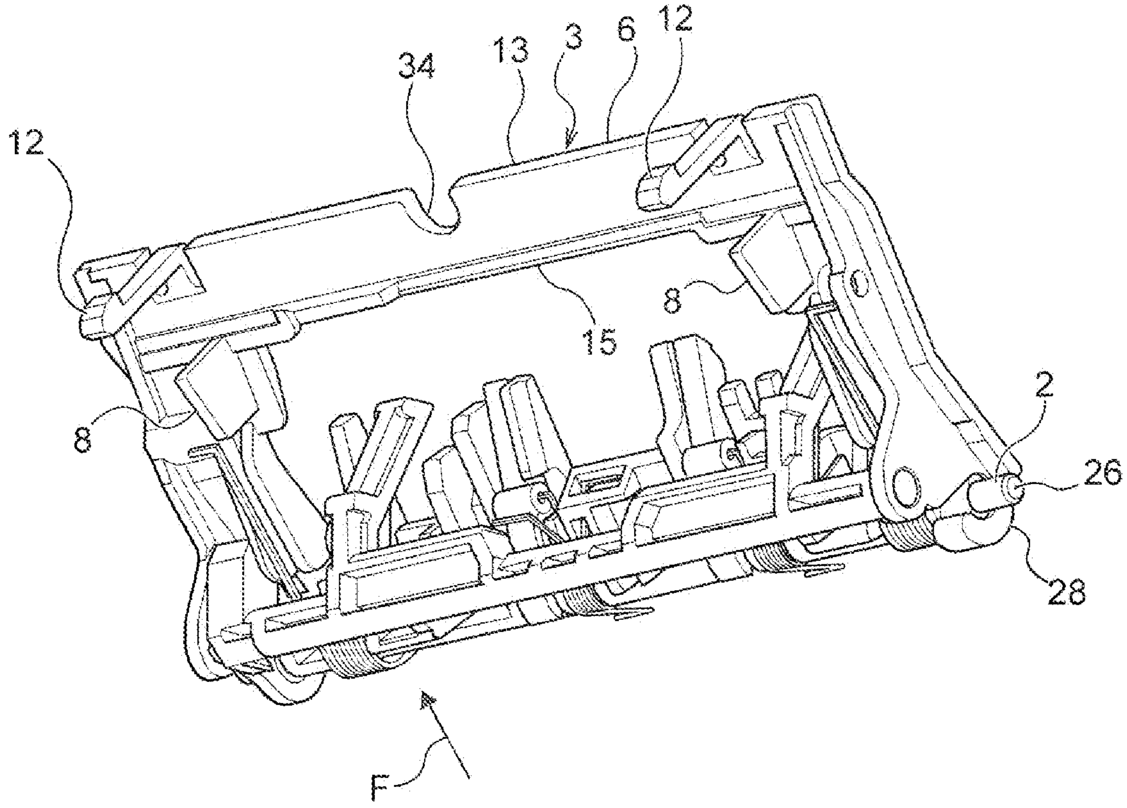
FIG. 6 is a perspective view of an opening/closing cover according to the first embodiment.

As shown in FIGS. 4 and 6, the rotation shaft 2 of the opening/closing cover 3 is located at the upstream end 28 of the opening/closing cover 3, and the engaging portion 12 is located at the downstream end 13 of the guide portion 6, which is the downstream end of the opening/closing cover 3. The elastic member 4 and the abutment portion 8 are located closer to the engaging portion 12 than the rotation shaft 2 in the conveying direction F.

Guide Portion

The opening/closing cover 3 includes the guide portion 6 that guides the medium 5. The guide portion 6 has a length L2 greater than a length L1 of separation roller 50 forming first roller 14 in the width direction (X-axis direction) intersecting the conveying direction F of the medium 5.

Furthermore, in the present embodiment, as illustrated in FIGS. 2 and 3, the first conveyance roller 9 includes two rollers 9 and 9 arranged side by side in the width direction (X-axis direction), and the length L2 of the guide portion 6 in the width direction (X-axis direction) is longer than the distance L3 between the two rollers 9 and 9.

Furthermore, in the present embodiment, as illustrated in FIGS. 2 and 3, the second conveyance roller 11 includes two rollers 11 and 11 arranged side by side in the width direction (X-axis direction), and the length L2 of the guide portion 6 in the width direction (X-axis direction) is longer than the distance L4 between the two rollers 11 and 11.

In the closed state, the opening/closing cover 3 can be displaced to a first position P1 where the guide portion 6 advances to the conveyance path 21 and a second position P2 where the guide portion 6 retracts from the conveyance path 21.

The guide portion 6 is applied with the elastic force E by the elastic member 4 so as to take a first position P1 when the first medium 51 (FIG. 9) such as thin paper is conveyed by the first roller 14, and take a second position P2 when the second medium 52 (FIG. 10B) such as a booklet, for example, having higher rigidity than the first medium 51 is conveyed. Here, in FIG. 9, the guide portion 6 is schematically shown as a triangle.

Figure 9:
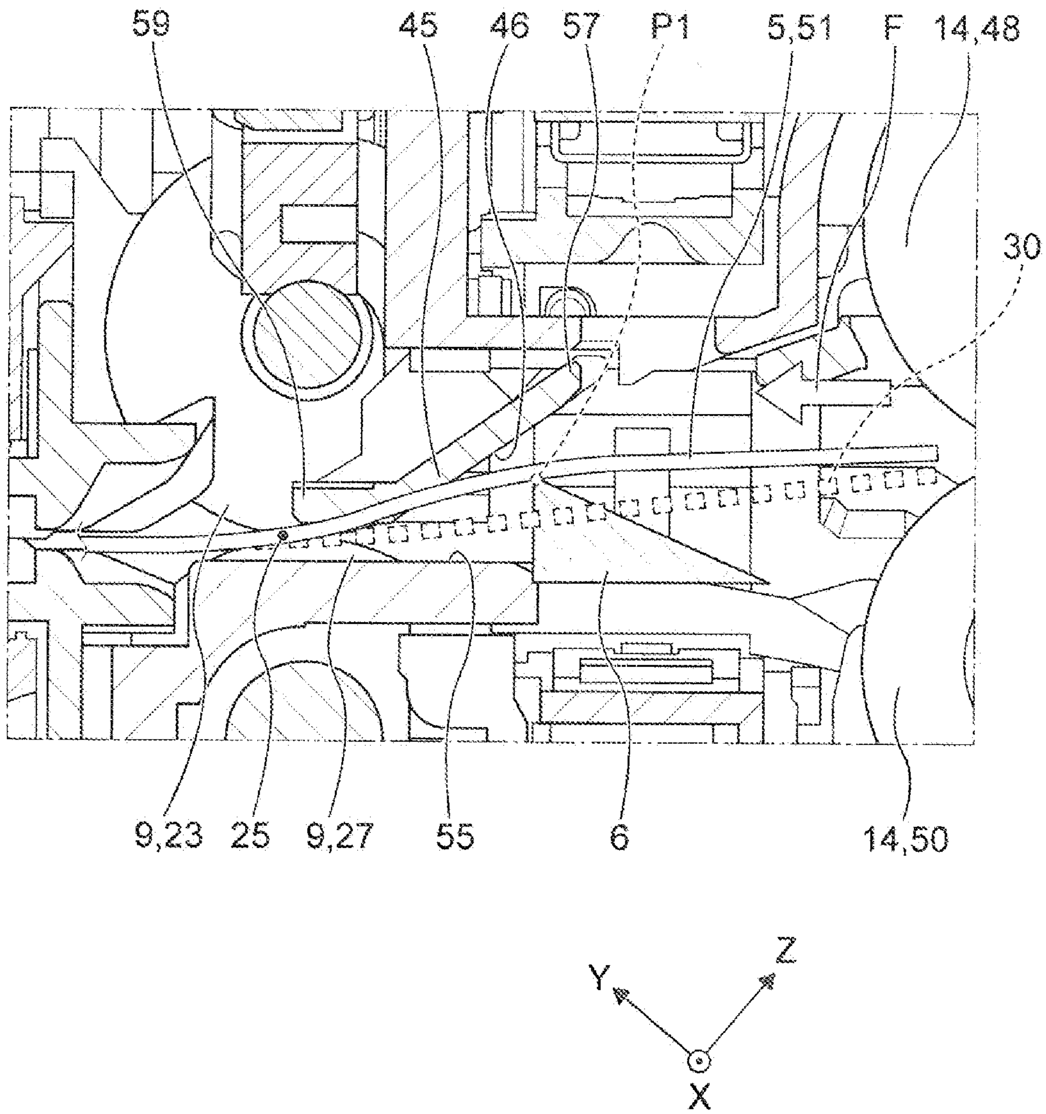
FIG. 9 is a configuration diagram of main parts of the first and second embodiments as viewed from the side.

As illustrated in FIGS. 4 and 9, when the opening/closing cover 3 is located at the first position P1, the advanced position of the guide portion 6 with respect to the conveyance path 21 is located above a virtual straight line 30 (FIGS. 4 and 9) connecting the nip position 24 of the first roller 14 and the nip position 25 of the first conveyance roller 9 when viewed in the width direction (X-axis direction), that is, in the side view direction.

As can be understood from FIGS. 4 and 6, when the guide portion 6 is located at the first position P1, the downstream end 13 of the guide portion 6 is provided to protrude from the upstream end 15 of the guide portion 6.

The first position P1 is a position where the guide portion 6 is most advanced with respect to the conveyance path 21, and the second position P2 is a position where the guide portion 6 is least advanced with respect to the conveyance path 21. The first position P1 is set with respect to the medium 5, assuming the medium 5 such as thin paper having the lowest rigidity among the media 5 to be used. The second position P2 is set with respect to the medium 5, assuming the medium 5 having the highest rigidity, in other words, a large thickness among the media 5 to be used.

Figure 10A:
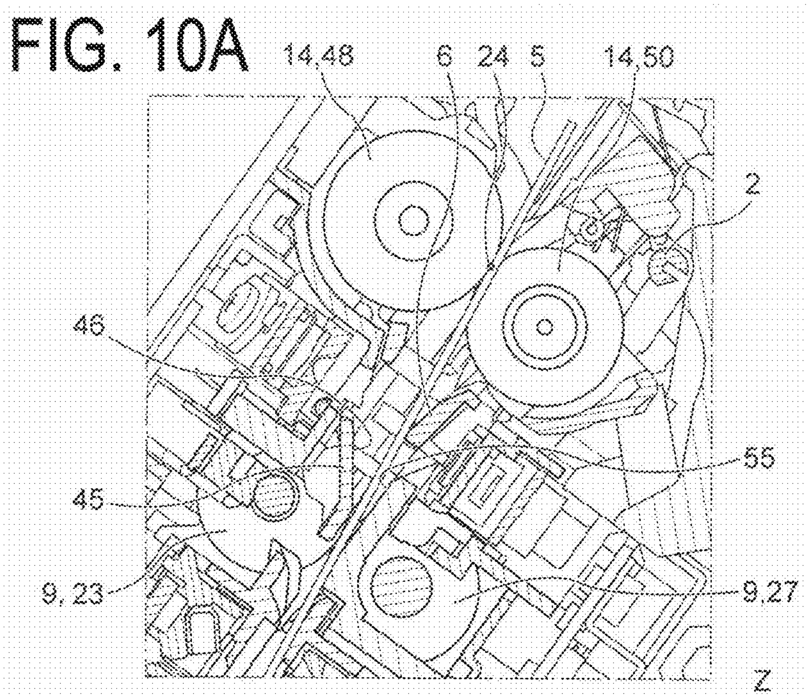
FIGS. 10A and 10B are configuration diagrams of main parts of the first and second embodiments as viewed from the side.

As shown in FIG. 10A, when the rigidity or thickness of the medium 5 belongs to a range between the minimum and the maximum of the assumed values, the advanced position of the guide portion 6 is a position between the first position P1 and the second position P2. FIG. 10A shows a case where the medium 3 has a rigidity to an extent that the conveyance posture in a state where the elastic force E is applied from the guide portion 6 substantially overlaps with the virtual line 30. When the medium 3 has the rigidity shown in FIG.

10A and the rigidity lower than such rigidity, the position of the separation roller 50 does not move even if the position of the guide portion 6 is displaced. This is because the medium 3 can be conveyed even if the separation roller 50 does not move.

Figure 10B:
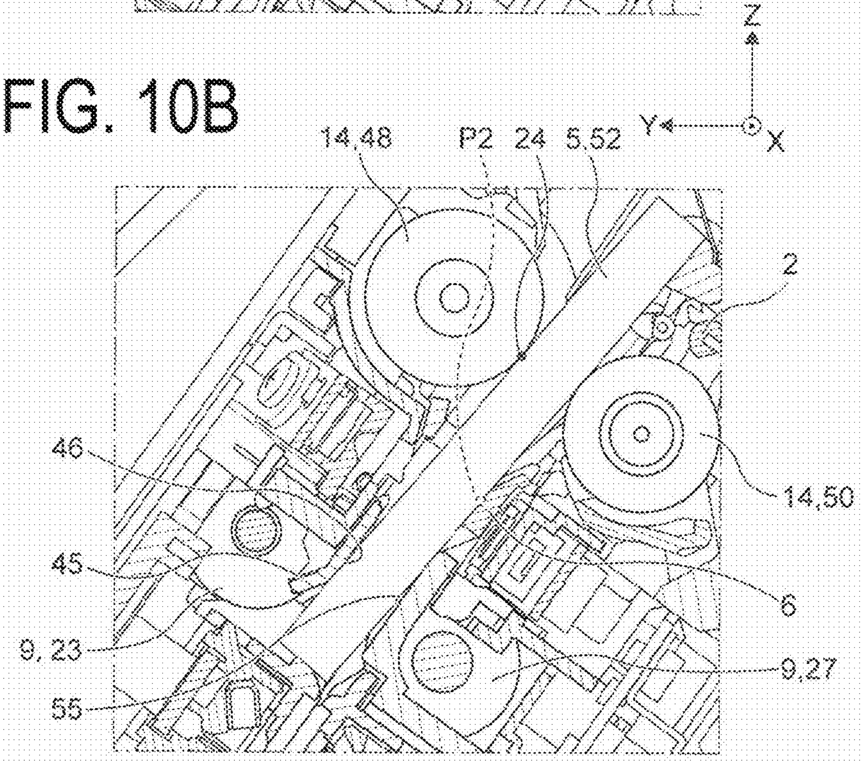

When the thickness of the medium 3 is thicker than that shown in FIG. 10A, the guide portion 6 is further pushed down by the thickness. That is, the guide portion 6 is pushed down than the position shown in FIG. 10A. FIG. 10B shows a case where the thickness of the medium 3 is the assumed maximum, and thus shows a state in which the guide portion 6 is pushed down the most.

In a case where the thickness of the medium 3 is thicker than that shown in FIG. 10A, if the separation roller 50 remains at the position of FIG. 10A, the conveying resistance of the medium 3 increases according to the magnitude of the thickness. Therefore, here, the separation roller 50 is formed in a structure capable of moving backward from the nip position 24 with the feed roller 48 so that the medium 5 having a large thickness such as a booklet can pass therethrough. Note that the opening/closing cover 3 has a structure in which, even if the separation roller 50 is moved, that is, displaced according to the thickness of the medium 3, the guide portion 6 is merely displaced, and the position of the opening/closing cover 3 itself, that is, the rotation shaft 2 of the opening/closing cover 3 does not move.

As illustrated in FIG. 3, the separation roller 50 is disposed on the inner side of both ends 16 and 17 of the first conveyance roller 9 in the width direction (X-axis direction). Here, the separation roller 50 is provided within a range of the ends 43 and 44 on the inner side of the first conveyance roller 9 in the width direction.

Furthermore, as illustrated in FIG. 4, a center 26 of the rotation shaft 2 of the guide portion 6 is located upstream of the nip position 24 of the separation roller 50 in conveying direction F. The downstream end 13 of the guide portion 6 is located between the separation roller 50 and the first conveyance roller 9 in the conveying direction F.

As shown in FIGS. 3 to 5, in the present embodiment, a multi-feed detection unit 32 capable of detecting multi-feeding of the medium 5 is provided. The opening/closing cover 3 is provided with a cutout part 34. The multi-feed detection unit 32 is configured to be exposed from the cutout part 34 in the closed state. Here, a known ultrasonic sensor is used as the multi-feed detection unit 32.

Description of Operation of First Embodiment (1) Case where the Rigidity of the Medium is the Assumed Minimum When the rigidity of the medium 5 is the assumed minimum, as shown in FIG. 9, the guide portion 6 receives the elastic force E of the elastic member 4 and advances to the first position P1. At this time, the separation roller 50 is configured so as not to move with the movement of the guide portion 6. In practice, the guide portion 6 is advanced to the first position P1 before the medium 5 reaches the position of the guide portion 6. The medium 5 is conveyed in the conveying direction F toward the guide portion 6 in the advanced state.

As a result, the medium 5 is conveyed while being curved to the upper side than the virtual line 30. According to this upward curve, even if a wrinkle such as wavy deformation generates in the medium when the medium is fed from the first roller 14, the wrinkle is corrected and planarized. The medium 5 is nipped by the first conveyance roller 9 in a planarized state, read by the reading unit 71, curved when reaching the curved inversion path 18 having the rib 54 through the second conveyance roller 11, and further conveyed downstream.

(2) Case where the Thickness of the Medium is the Assumed Maximum

When the thickness of the medium 5 is the assumed maximum, as illustrated in FIG. 10B, the guide portion 6 is pushed down to the second position P2 by the conveyed medium 5. Here, prior to the displacement of the guide portion 6 to the second position P2, the separation roller 50 moves backward from the nip position 24 with the feed roller 48 and moves so that the medium 5 having a large thickness such as a booklet can pass therethrough.

As a result, the medium 5 is conveyed toward the reading region of the reading unit 71 in a state where the increase in the conveying resistance is suppressed by the movement of the separation roller 50.

Here, the medium 5 is configured to be discharged to the outside of the device from a discharge path (not illustrated) in a planar state without passing through the curved inversion path 18 after passing through the reading region of the reading unit 71.

(3) Case where the Rigidity or the Thickness of the Medium is Between (1) and (2)

In this case, the medium 5 is conveyed in a state where the guide portion 6 is displaced to a position within the displacement range of the first position P1 and the second position P2, where the rigidity of the medium 5 and the elastic force E of the elastic member 4 are balanced. The state of FIG. 10A is a state in which the medium 5 is balanced with the elastic force E in a planar posture without being curved. When the thickness of the medium 5 is larger than FIG. 10A, the separation roller 50 moves in a direction away from the nip position 24, which is a direction in which an increase in conveying resistance is suppressed according to the thickness of the medium 5.

Description of Effect of First Embodiment (1) In the present embodiment, the opening/closing cover 3 includes the guide portion 6 that is longer than the length L1 of the first roller 14 in the width direction (X-axis direction) and guides the medium 5. Furthermore, in the closed state, the opening/closing cover 3 can be displaced to a first position P1 where the guide portion 6 advances to the conveyance path 21 and a second position P2 where the guide portion 6 retracts from the conveyance path 21. That is, since the opening/closing cover 3 also serves as the guide portion 6, the guide portion 6 can be provided without increasing the number of parts, and the conveyance accuracy of the medium 5 can be improved. In addition, downsizing can be promoted.

The opening/closing cover 3 is applied with force by the elastic member 4 so as to take a first position P1 when the first medium 51 is conveyed by the first roller 14, and take a second position P2 when the second medium 52 having higher rigidity than the first medium 51 is conveyed. As a result, displacement between the first position P1 and the second position P2 can be realized with a simple structure. Furthermore, an increase in back tension on the medium 5 can be suppressed.

In addition, in a case where the first medium 51 is a medium having low rigidity such as thin paper, wrinkles such as wavy deformation are likely to generate in the medium 5 due to contact with the first roller 14. However, in this aspect, the guide portion 6 having the length L2 longer than the width L1 of the first roller 14 in the width direction is displaced to the first position P1 of advancing to the conveyance path, so that generation of wrinkles in the medium 5 can be suppressed. On the other hand, when the second medium 52 is the medium 5 having high rigidity, the wrinkles are less likely to generate, but since the medium 5 having high rigidity such as a booklet has a large thickness in most cases, the conveyance path 21 becomes narrow in the thickness direction of the medium 5 by the increased thickness, the conveying resistance is increased, and the medium 5 is likely to be unstably conveyed. However, in this aspect, the guide portion 6 is displaced to the second position P2 of retracting from the conveyance path 21, and thus the increase in the thicknesses can be canceled. As a result, even if the second medium 52 is a medium having high rigidity, an increase in conveying resistance can be suppressed, and stable conveyance can be realized.

(2) Furthermore, in the present embodiment, since the opening/closing cover 3 includes the abutment portion 8 and the engaging portion 12, the opening/closing cover 3 can be stably displaced between the open state and the closed state by being turned with the rotation shaft 2 as a turning fulcrum.

(3) Moreover, in the present embodiment, the first position P1 is a position where the guide portion 6 is most advanced with respect to the conveyance path 21, and the second position P2 is a position where the guide portion 6 is least advanced. Thus, in the case of the medium 5 having the lowest rigidity, the medium 5 can be conveyed in a state where the rigidity of the medium 5 is increased by displacing the guide portion 6 to the first position 1. On the other hand, in the case of the medium 5 having high rigidity and the largest thickness, an increase in the conveying resistance of the medium 5 can be suppressed and stable conveyance can be prevented from being inhibited by displacing the guide portion 6 to the second position P2.

(4) In the present embodiment, when the guide portion 6 is at the first position P1, the downstream end 13 of the guide portion 6 protrudes more than the upstream end 15 of the guide portion 6. As a result, the downstream end 13 of the guide portion 6 comes into contact with the medium 5, so that the medium 5 can be formed in a curved shape, and the rigidity of the medium 5 can be easily increased.

(5) In the present embodiment, a first conveyance roller 9 that is provided between the first roller 14 and the reading units 71 and 72 and conveys the medium 5 is provided, and the first roller 14 is a roller pair including a separation roller 50 capable of separating the medium 5. Furthermore, the separation roller 50 is disposed on the inner side of both ends 16 and 17 of the first conveyance roller 9. As a result, the separation function of the separation roller 50 can be effectively exhibited while increasing the space efficiency of the installation portion of the first conveyance roller 9 and the separation roller 50. Furthermore, an increase in back tension on the medium 5 can be suppressed.

(6) In the present embodiment, the center 26 of the rotation shaft 2 of the guide portion 6 is located upstream of the nip position 24 of the separation roller 50 in the conveying direction F. Furthermore, the downstream end 13 of the guide portion 6 is located between the separation roller 50 and the first conveyance roller 9 in the conveying direction F. As a result, the guide portion 6 can be stably brought into contact with the medium 5 conveyed downstream from the separation roller 50, and thus wrinkles of the medium 5 generate by the separation roller 50 can be stably corrected and planarized.

(7) In the present embodiment, the length L2 of the guide portion 6 in the width direction is longer than the distance L3 between the two rollers 9 and 9 constituting the first conveyance roller 9. Thus, the wrinkles of the medium 5 generated by the separation roller 50 can be more reliably corrected and planarized.

The correcting function with respect to the wrinkles can be further enhanced by making the length of the guide portion 6 longer than the distance between both ends 16 and 17 of the two rollers.

(8) In the present embodiment, the elastic member 4 is located closer to the engaging portion 12 than the rotation shaft 2 in the conveying direction F. As described above, since the elastic member 4 is located closer to the engaging portion 12 than the rotation shaft 2 in the conveying direction F, the elastic force E of the elastic member 4 can be stably applied.

(9) In the present embodiment, since the separation roller 50 is located between the first elastic member 41 and the second elastic member 42 in the width direction, the elastic force E can be applied to the opening/closing cover 3 at two points. Thus, the opening/closing cover 3 can be stably displaced.

(10) In the present embodiment, regarding the opening/closing cover 3, when the guide portion 6 is located at the first position P1, the advanced position of the guide portion 6 is located above the virtual straight line 30 connecting the nip position 24 of the first roller 14 and the nip position 25 of the first conveyance roller 9 when viewed in the width direction, that is, in the side view direction. Thus, the wrinkles of the medium 5 generated by the first roller 14 can be effectively corrected and planarized.

(11) In addition, in the present embodiment, the opening/closing cover 3 is provided with the cutout part 34, and the multi-feed detection unit 32 is exposed from the cutout part 34 in the closed state of the opening/closing cover 3. As a result, the multi-feed detection unit 32 can be arranged in a space-saving manner.

(12) In the present embodiment, the length L2 of the guide portion 6 is longer than the distance L4 between the two rollers 11 and 11 constituting the second conveyance roller 11. In this respect, the wrinkles of the medium 5 generated by the first roller 14 can be effectively planarized.

When the medium 5 passes through the curved inversion path 18, if wrinkles such as wavy deformation are generated, the wrinkles are crushed and traces remain. However, in the present embodiment, the medium 5 is sent to the curved inversion path 18 in a state where the wrinkles are corrected and planarized by the guide portion 6. As a result, it is possible to reduce the possibility of the wrinkle being crushed and the traces remaining at the curved inversion path 18. In the structure in which the plurality of ribs 54 are arranged in the width direction in the curved inversion path 18, the problem of "crushing and traces remaining" is likely to occur, but in the present embodiment, the occurrence of such a problem can be reduced.

Second Embodiment

Next, an image reading device 1 according to a second embodiment will be described. The same parts as those in the first embodiment are denoted by the same reference numerals, and description of the configurations and corresponding effects will be omitted.

As illustrated in FIG. 9, in the present embodiment, in the conveying direction F, a first conveyance roller 9 that is provided between the first roller 14 and the reading units 71 and 72, and conveys the medium 5, and an upper guide 45 that forms a part of the conveyance path 21 are provided.

The medium 5 guided by the guide portion 6 comes into contact with the guiding surface 46 of the upper guide 45 and is guided toward the first conveyance roller 9.

As illustrated in FIG. 9, the upper guide 45 is displaceable in a direction (X-axis direction) intersecting the conveying direction F, and is provided at a position overlapping the guide portion 6 in the conveying direction F.

The position P1 at which the guide portion 6 is most advanced with respect to the conveyance path 21 is between the upstream end 57 of the upper guide 45 and the downstream end 59 of the upper guide 45 in the direction orthogonal to the virtual straight line (FIG. 9).

Figure 7:
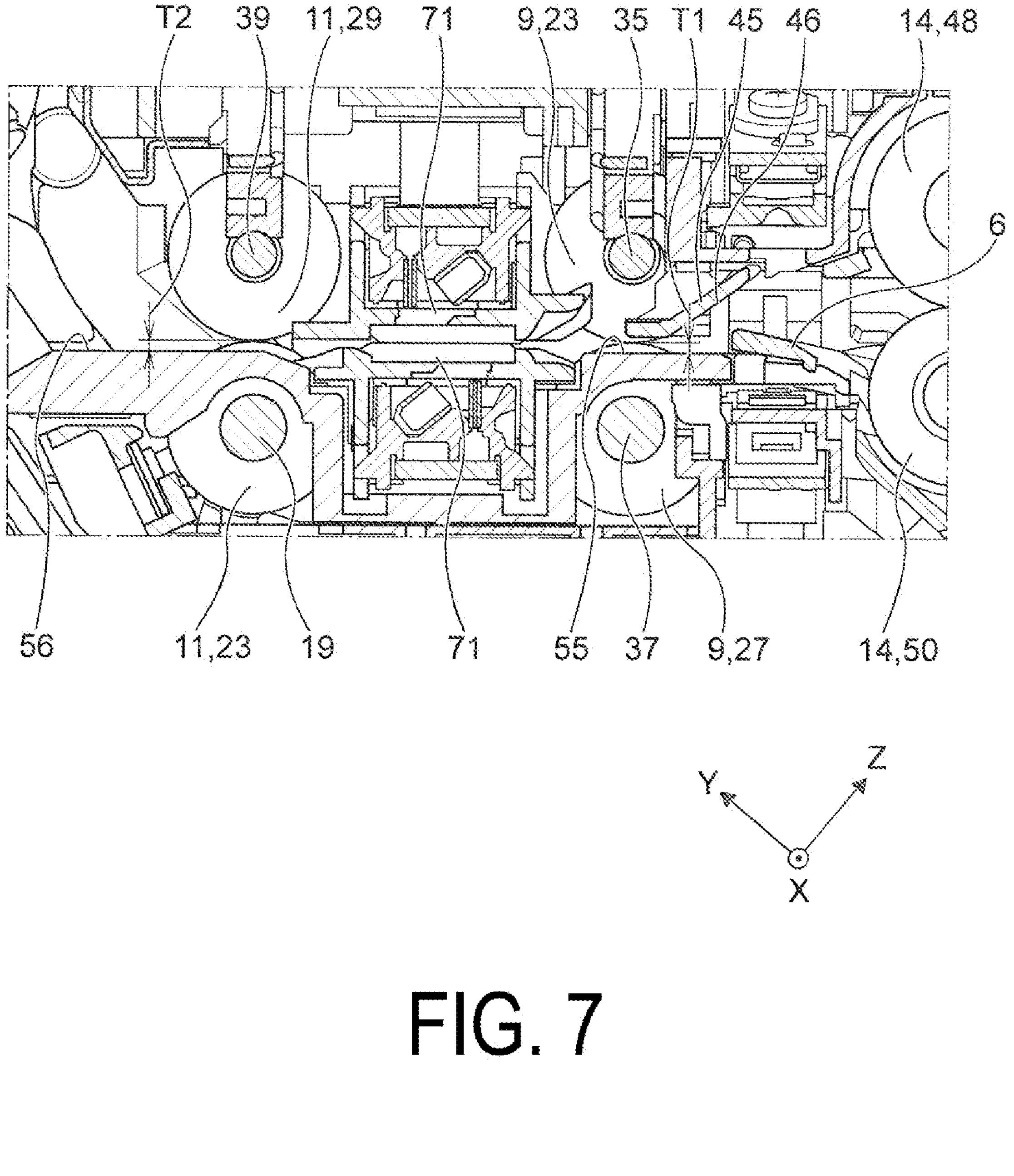
FIG. 7 is a configuration diagram of a main part of the first embodiment as viewed from the side.

Furthermore, as illustrated in FIG. 7, the protruding amount T1 of the lower conveyance roller 27 of the first conveyance roller 9 with respect to the lower path surface 55 of the conveyance path 21 and the protruding amount T2 of the lower second conveyance roller 33 of the second conveyance roller 11 with respect to the lower path surface 56 of the conveyance path 21 are configured to be the same.

Here, the "protruding amount of the first conveyance roller 9 with respect to the conveyance path 21" means a distance T1 protruding upward with respect to the lower path surface 55, which is the upper surface of the path constituting member in which the nip position 25 guides the lower surface of the medium 5 to be conveyed, at the position of the first conveyance roller 9 in the conveying direction F. Furthermore, the "protruding amount of the second conveyance roller 11 with respect to the conveyance path 21" means a distance T2 protruding upward with respect to the lower path surface 56, which is the upper surface of the path constituting member in which the nip position 31 guides the lower surface of the medium 5 to be conveyed, at the position of the second conveyance roller 11 in the conveying direction F.

Description of Effect of Second Embodiment (1) In the present embodiment, the medium 5 guided by the guide portion 6 comes into contact with the guiding surface 46 of the upper guide 45 and is guided toward the first conveyance roller 9. Thus, the medium 5 can be stably guided to the first conveyance roller 9.

(2) In addition, in the present embodiment, the upper guide 45 is displaceable in a direction intersecting the conveying direction F, and is at a position overlapping the guide portion 6 in the conveying direction F. Accordingly, downsizing in the conveying direction F can be realized.

(3) Furthermore, in the present embodiment, the position P2 at which the guide portion 6 is most advanced with respect to the conveyance path 21 is between the upstream end 57 of the upper guide 45 and the downstream end 59 of the upper guide 45 in the direction orthogonal to the virtual straight line 30. This may effectively increase the rigidity of the medium 5. (4) In the present embodiment, the protruding amount T1 of the first conveyance roller 9 with respect to the conveyance path 21 is the same as the protruding amount T2 of the second conveyance roller 11 with respect to the conveyance path 21. Since the protruding amounts T1 and T2 of the first conveyance roller 9 and the second conveyance roller 11 are the same as described above, the conveying ability of the medium 5 is stabilized.

Third Embodiment

Next, an image reading device 1 according to a third embodiment will be described with reference to FIGS. 11A, 11B and 12. The same parts as those in the first embodiment or the second embodiment are denoted by the same reference numerals, and the description of the configurations and corresponding effects will be omitted.

Figure 11A:
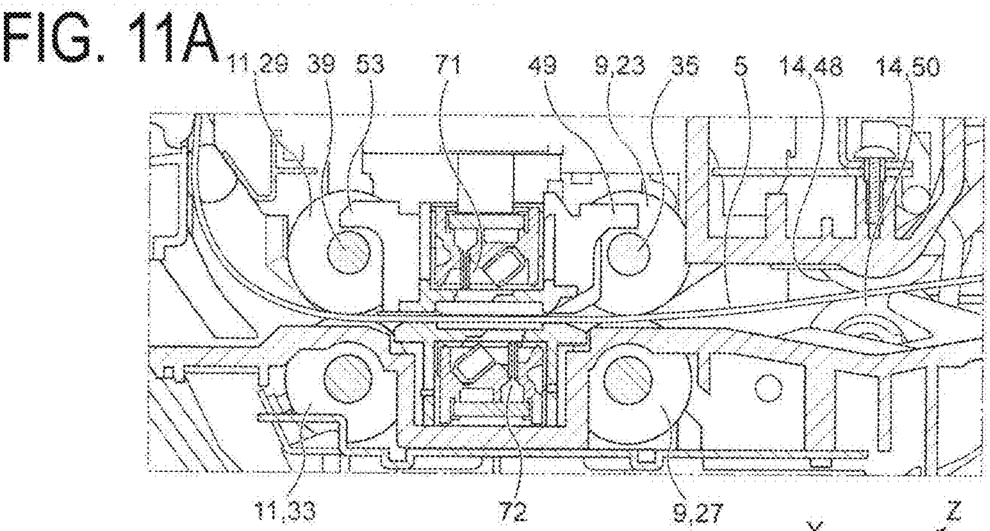
FIGS. 11A and 11B are configuration diagrams of a main part of a third embodiment as viewed from the side.
Figure 11B:
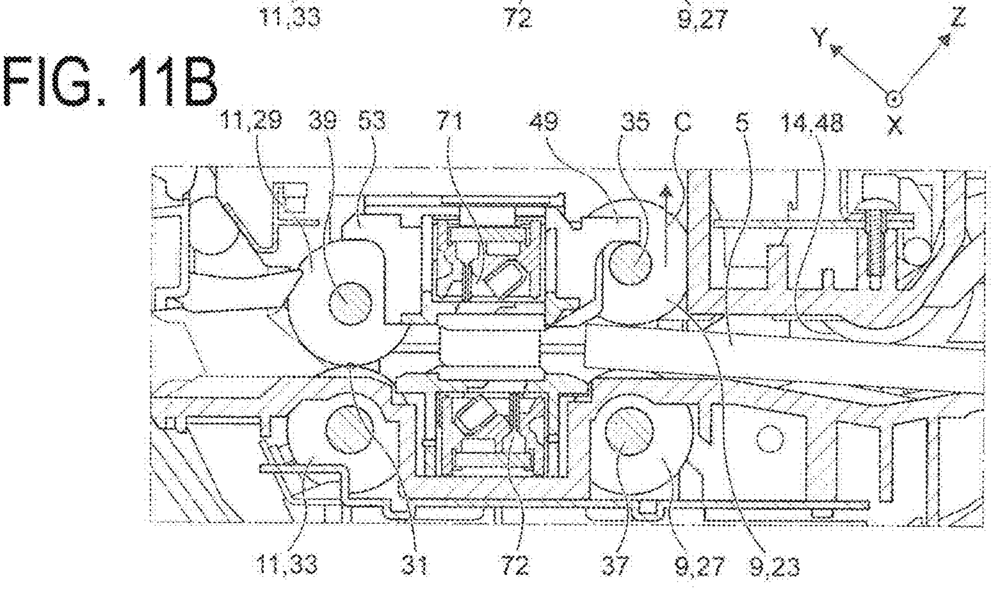
Figure 12:
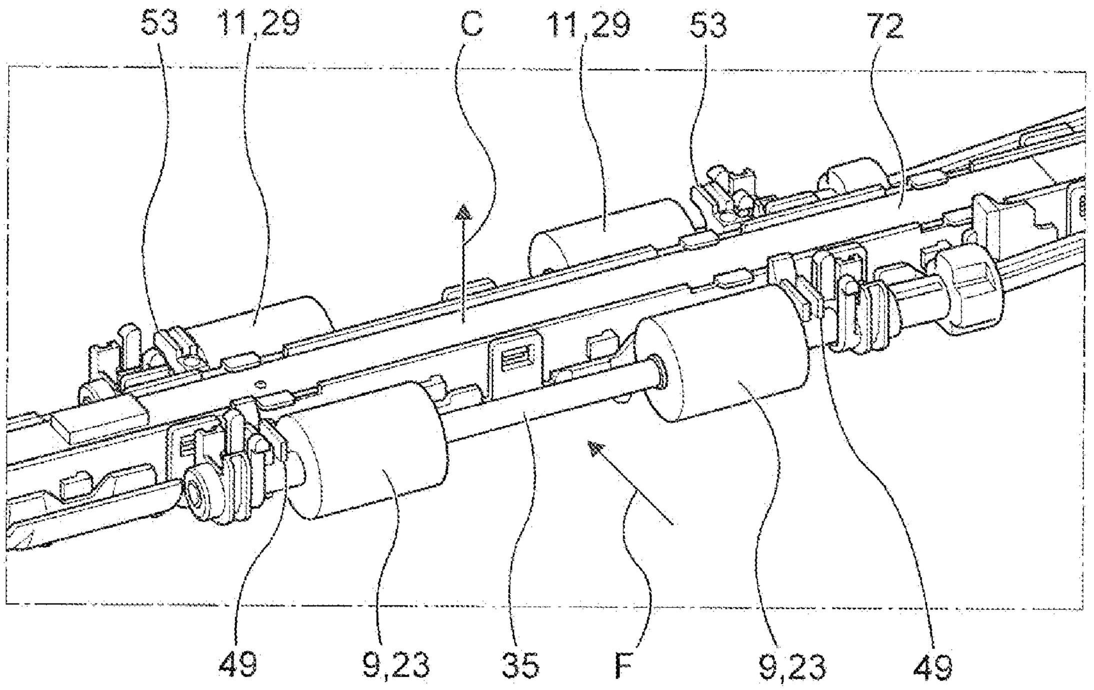
FIG. 12 is a perspective view of a main part of the third embodiment.

As illustrated in FIGS. 11A and 11B, in the present embodiment, the reading unit 71 is provided to be movable in the intersecting direction C intersecting the conveying direction Y. The first conveyance roller 9 is constituted by a pair of an upper conveyance roller 23 located on the upper side of the medium 5 and a lower conveyance roller 27 located on the lower side, and the upper conveyance roller 23 is provided to be movable in an intersecting direction C intersecting the conveying direction F. An interlocking portion 49 that moves the reading unit 71 in the intersecting direction C in conjunction with the movement of the upper conveyance roller 23 in the intersecting direction C is provided. The interlocking portion 49 is fixed to the reading unit 71.

In the present embodiment, the upper second conveyance roller 29 of the second conveyance roller 11 is also provided to be movable in the intersecting direction C intersecting the conveying direction F. In the reading unit 71, an interlocking portion 53 is also fixed to the upper second conveyance roller 29 side of the second conveyance roller 11 in a symmetrical arrangement with the interlocking portion 49.

When the medium 5 is conveyed with the guide portion 6 at the second position P2 (FIG. 11B), the interlocking portion 49 is lifted in the intersecting direction C by the rotation shaft 35 as the upper conveyance roller 23 moves in the intersecting direction C, which is a direction away from the lower conveyance roller 27, by the medium 5. Accordingly, the reading unit 71 integrated with the interlocking portion 40 also moves in the same direction C. Thus, the reading unit 71 can read the medium 5 at an appropriate reading distance.

When the medium 5 is conveyed with the guide portion 6 at the second position P2 (FIG. 11B), the interlocking portion 53 also lifts the rotation shaft 39 in the intersecting direction C which comes into contact with the interlocking portion 53 and stops as the upper second conveyance roller 29 moves in the intersecting direction C, which is a direction away from the lower second conveyance roller 33, by the medium 5. As a result, both the upstream side and the downstream side of the reading unit 71 in the conveying direction F are supported by the rotation shaft 35 and the rotation shaft 39. This state is maintained until the terminating end of the medium 5 passes through the reading region of the reading unit 71 and further passes through the nip position 31 of the second conveyance roller 11.

Description of Operation of Third Embodiment (1) Thin Paper Having Low Rigidity (FIG. 11A)

When the medium 5 to be conveyed is a thin sheet or the like having low rigidity, as illustrated in FIG. 11A, the upper conveyance roller 23 of the first conveyance roller 9 conveys the medium 5 in a state of being located at the nip position 25 without moving in the intersecting direction C. Then, the medium 5 reads an image in a state of a reading distance set in a reading region of the reading unit 71.

Furthermore, the medium 5 reaches the curved inversion path 18 having the rib 54 through the second conveyance roller 11, and is curved and conveyed further downstream.

(2) Thick Paper Having High Rigidity (FIG. 11B)

When the medium 5 to be conveyed is thick such as a booklet having high rigidity, as shown in FIG. 11B, the upper conveyance roller 23 of the first conveyance roller 9 is first lifted by the thick medium 23 and starts to be moved in the intersecting direction C. Subsequently, the rotation shaft 35 of the upper conveyance roller 23 abuts on the interlocking portion 49 fixed to the reading unit 71 from below. The rotation shaft 35 moves in the intersecting direction C by an amount corresponding to the thickness of the medium 5, and the reading unit 71 also moves in the intersecting direction C together with this movement to be in the state of FIG. 11B.

Furthermore, the medium 5 is conveyed in the conveying direction F, passed through the reading region of the reading unit 71 lifted up to the position in the state of FIG. 11B, and the reading of the image is performed. At this time, since the reading unit 71 is lifted in the intersecting direction C by an amount corresponding to the thickness of the medium 5, the image is read in a state of an appropriate reading distance.

When the leading end of the medium 5 passes through the reading region of the reading unit 71 and further starts to enter the nip position 31 of the upper second conveyance roller 29, the upper second conveyance roller 29 first starts to move in the intersecting direction C, which is a direction away from the lower second conveyance roller 33, due to the thickness of the medium 5. As a result, the rotation shaft 39 is lifted in the intersecting direction C, and as illustrated in FIG. 11B, the rotation shaft abuts on the interlocking portion 53 fixed to the reading unit 71 in the already lifted state from below to stop the movement. Note that FIG. 11B shows a state before the rotation shaft 39 is lifted in the intersecting direction C. As a result, both the upstream side and the downstream side of the reading unit 71 in the conveying direction F are supported by the rotation shaft 35 and the rotation shaft 39 through the interlocking portion 49 and the interlocking portion 53. This state is maintained until the terminating end of the medium 5 passes through the reading region of the reading unit 71 and further passes through the nip position 31 of the second conveyance roller 11.

Here, after passing through the reading region of the reading unit 71, the leading end of the medium 5 is discharged to the outside of the device from the discharge path (not illustrated) in a planar state without passing through the curved inversion path 18.

According to the present embodiment, when the medium 5 is conveyed with the guide portion 6 at the second position P2, the upper conveyance roller 23 moves in a direction away from the lower conveyance roller 27, that is, the intersecting direction C by the medium 5, so that the reading unit 71 also moves in the same direction C via the interlocking portion 49. As a result, when the thick medium 5 such as a booklet is conveyed and read by the reading unit 71, the position of the reading unit 71 is automatically lifted in the intersecting direction C, which is the direction of moving away, by the thick medium 5, so that reading by the reading unit 71 can be performed at an appropriate reading distance, and reading is stabilized.

Other Embodiments

The image reading device 1 according to the present disclosure is based on having the configuration of the embodiment described above, but it is of course possible to change or omit a partial configuration within a scope not deviating from the gist of the disclosure of the present application.

In the above embodiment, it has been described that the elastic member 4 and the opening/closing cover 3 are configured as separate independent members, that is, separate bodies, but the present disclosure is not limited to the separate structure. The elastic member 4 may be formed integrally with the opening/closing cover 3. For example, the opening/closing cover 3 and the elastic member 4 are made of a plastic material by integral molding or the like, and a portion corresponding to the elastic member 4 can be made elastically deformable.

Furthermore, the opening/closing cover 3 itself may be made of an elastic body, or the opening/closing cover 3 itself may be made in a state of being substantially rigid, and only a portion of the elastic member 4 may be formed so as to express elastic force.

When the elastic member 4 is integrated with the opening/closing cover 3, the number of parts can be reduced.

In the above embodiment, it has been described that the upper guide 45 is at a position overlapping the guide portion 6 in the conveying direction F, but the present disclosure is not limited to this structure. As illustrated in FIGS. 10A and 10B, it may be at a position not overlapping the guide portion 6 in the conveying direction F. When the upper guide 45 is at a position not overlapping the guide portion 6, the following effects can be obtained. The distance between the guide portion 6 and the upper guide 45 can be increased, and even if the advancing amount of the guide portion 6 with respect to the conveyance path 21 and the displacement amount of the upper guide 45 are increased, the possibility of interference therebetween can be reduced. Thus, the medium 5 can be effectively planarized and conveyed.

In the above embodiment, a case where the structure in which the opening/closing cover 3 also serves as the guide portion 6 is applied to the image reading device has been described, but the present disclosure is also applicable to a medium feeding device having a structure for feeding or conveying a medium, or a liquid ejection device such as a printer.

What is claimed is:

1. An image reading device comprising:

an opening/closing cover configured to turn with a rotation shaft as a turning fulcrum and to be opened and closed between an open state and a closed state;

a first roller that is replaceable when the opening/closing cover is opened, the first roller being provided in a conveyance path; and a reading unit that is provided downstream of the first roller in a conveying direction along the conveyance path and reads an image of a medium; wherein an elastic member configured to apply a force to the opening/closing cover in a direction from the closed state to the open state is provided;

the opening/closing cover includes a guide portion that guides the medium, the guide portion being longer than a length of the first roller in a width direction intersecting a conveying direction of the medium, in the closed state, the guide portion is displaceable between a first position at which the guide portion advances to the conveyance path and a second position at which the guide portion retreats from the conveyance path, and the guide portion is applied with force by the elastic member so as to take the first position when a first medium is conveyed by the first roller, and take the second position when a second medium having higher rigidity than the first medium is conveyed.

2. The image reading device according to claim 1, wherein the opening/closing cover includes, an abutment portion configured to abut on the elastic member, and an engaging portion that is not engaged with an engaged portion in the closed state but is configured to engage with the engaged portion in the open state.

3. The image reading device according to claim 1, wherein the first position is a position at which the guide portion is most advanced with respect to the conveyance path, and the second position is a position at which the guide portion is least advanced with respect to the conveyance path.

4. The image reading device according to claim 1, wherein when the guide portion is at the first position, a downstream end of the guide portion protrudes further than an upstream end of the guide portion.

5. The image reading device according to claim 1, further comprising a first conveyance roller that is provided between the first roller and the reading unit in the conveying direction and conveys the medium, wherein the first roller is a roller pair including a separation roller configured to separate the medium, and the separation roller is disposed on an inner side of both ends of the first conveyance roller in the width direction.

6. The image reading device according of claim 1, wherein a center of a rotation shaft of the guide portion is located upstream of a nip position of the separation roller in the conveying direction, and a downstream end of the guide portion is located between the separation roller and the first conveyance roller in the conveying direction.

7. The image reading device according to claim 5, wherein the first conveyance roller includes two rollers arranged side by side in the width direction, and a length of the guide portion in the width direction is longer than a distance between the two rollers.

8. The image reading device according to claim 2, wherein the rotation shaft is located at an upstream end of the opening/closing cover, the engaging portion is located at a downstream end of the opening/closing cover, and the elastic member is located closer to the engaging portion than the rotation shaft in the conveying direction.

9. The image reading device according to claim 1, wherein the elastic member includes a first elastic member and a second elastic member, and the separation roller is located between the first elastic member and the second elastic member in the width direction.

10. The image reading device according to claim 1, wherein when the opening/closing cover is located at the first position, an advanced position of the guide portion with respect to the conveyance path is located above a virtual straight line connecting a nip position of the first roller and a nip position of the first conveyance roller when viewed in the width direction.

11. The image reading device according to claim 1, further comprising:

a multi-feed detection unit configured to detect multi-feeding of the medium; wherein the opening/closing cover is provided with a cutout part, and the multi-feed detection unit is exposed from the cutout part in the closed state.

12. The image reading device according to claim 5, further comprising:

a second conveyance roller provided downstream of the first conveyance roller, and a curved inversion path that is provided downstream of the second conveyance roller and is curved and inverted; wherein the second conveyance roller includes two rollers arranged side by side in the width direction, and a length of the guide portion in the width direction is longer than a distance between the two rollers.

13. The image reading device according to claim 1, wherein the elastic member is integrally configured with the opening/closing cover.

14. The image reading device according to claim 1, further comprising:

a first conveyance roller that is provided between the first roller and the reading unit in the conveying direction and conveys a medium, and an upper guide forming a part of the conveyance path; wherein the medium guided by the guide portion comes into contact with a guiding surface of the upper guide to be guided toward the first conveyance roller.

15. The image reading device according to claim 14, wherein the upper guide is displaceable in a direction intersecting the conveying direction, and is located at a position not overlapping with the guide portion in the conveying direction.

16. The image reading device according to claim 14, wherein the upper guide is displaceable in a direction intersecting the conveying direction, and at a position overlapping with the guide portion in the conveying direction.

17. The image reading device according to claim 10, further comprising:

an upper guide that is located on an upper side of the conveyance path and forms a part of the conveyance path; wherein the medium guided by the guide portion comes into contact with a guiding surface of the upper guide to be guided toward the first conveyance roller; and a most advanced position of the guide portion with respect to the conveyance path is located between an upstream end of the upper guide and a downstream end of the upper guide in a direction orthogonal to the virtual straight line.

18. The image reading device according to claim 5, further comprising:

a second conveyance roller located downstream of the first conveyance roller; wherein a protruding amount of the first conveyance roller with respect to the conveyance path is the same as a protruding amount of the second roller with respect to the conveyance path.

19. The image reading device according to claim 5, wherein the reading unit is provided to be movable in an intersecting direction intersecting the conveying direction;

the first conveyance roller is configured by, a pair of an upper conveyance roller located on an upper side of the medium and a lower conveyance roller located on a lower side of the medium, the upper conveyance roller is provided to be movable in an intersecting direction intersecting the conveying direction, an interlocking portion that moves the reading unit in the intersecting direction in conjunction with the movement in the intersecting direction of the upper conveyance roller, and the interlocking portion moves the upper conveyance roller in a direction away from the lower conveyance roller by the medium to move the reading unit in the same direction when the medium is conveyed with the guide portion at the second position.

* * * * *